United States Patent [19]
Sekiya et al.

[11] Patent Number: 5,192,626
[45] Date of Patent: Mar. 9, 1993

[54] OPTICAL RECORDING MEDIUM

[75] Inventors: Masahiko Sekiya, Hino; Takayuki Ishizaki, Toyonaka; Kiyoshi Chiba, Chofu, all of Japan

[73] Assignee: Teijin Limited, Osaka, Japan

[21] Appl. No.: 715,024

[22] Filed: Jun. 13, 1991

Related U.S. Application Data

[63] Continuation of Ser. No. 447,172, Dec. 7, 1989, abandoned.

[30] Foreign Application Priority Data

Dec. 14, 1988 [JP] Japan .................. 63-313751
Dec. 28, 1988 [JP] Japan .................. 63-328851
Jun. 1, 1989 [JP] Japan .................. 1-137382

[51] Int. Cl.$^5$ ................................ G11B 5/66
[52] U.S. Cl. ..................... 428/694; 428/698; 428/701; 428/704; 428/900; 360/131; 360/135; 365/120; 369/13; 430/945
[58] Field of Search ............... 428/694, 698, 900, 701, 428/704; 430/945; 360/131, 135; 365/120; 369/13

[56] References Cited
U.S. PATENT DOCUMENTS

| | | | |
|---|---|---|---|
| 4,680,742 | 7/1987 | Yamada | 369/13 |
| 4,695,510 | 9/1987 | Sawamura | 428/694 |
| 4,800,112 | 1/1989 | Kano et al. | 428/694 |

FOREIGN PATENT DOCUMENTS

| | | |
|---|---|---|
| 0152269 | 8/1985 | European Pat. Off. |
| 245833 | 11/1987 | European Pat. Off. |
| 298612 | 1/1989 | European Pat. Off. |
| 2558003 | 7/1985 | France |
| 52-31703 | 3/1977 | Japan |
| 58-73746 | 5/1983 | Japan |
| 048151 | 3/1986 | Japan |
| 092456 | 5/1986 | Japan |
| 197939 | 9/1987 | Japan |
| 275340 | 11/1987 | Japan |
| 050931 | 3/1988 | Japan |
| 255855 | 10/1988 | Japan |

OTHER PUBLICATIONS

Patent Abstracts of Japan, vol. 9, No. 190—Aug. 7, 1985.
Patent Abstracts of Japan vol. II, No. 256—Aug. 20, 1987.

*Primary Examiner*—Paul J. Thibodeau
*Assistant Examiner*—R. Follet
*Attorney, Agent, or Firm*—Burgess, Ryan & Wayne

[57] ABSTRACT

An optical recording medium comprising a transparent dielectric layer as a protecting and/or enhancing layer is provided, wherein the transparent dielectric layer is made of an oxide of at least one metal selected from the group consisting of indium, tin and tantalum, the oxide further containing at least one element selected from the group of nitrogen and bismuth. This transparent dieletric layer has an excellent adhesivity to a resin substrate, a low internal stress, and a high refractive index.

16 Claims, 1 Drawing Sheet

OPTICAL RECORDING MEDIUM

This application is a continuation of application Ser. No. 447,172, filed Dec. 7, 1989, now abandoned.

BACKGROUND OF THE INVENTION

1. Field of the Invention

The present invention relates to an optical recording medium which records and/or reproduces information by a laser beam or the like, more specifically, to such an optical recording medium having a transparent dielectric layer as a protecting layer and/or an enhancing layer.

2. Description of the Related Art

Intensive research and development of optical recording mediums is underway, because of the high density and large information recording capacity of the mediums. Particularly, serious interest is shown in magneto-optical recording mediums, which are rewritable and thus can be applied in many fields. Nevertheless, although many materials and systems therefor have been proposed, there is still an urgent need for magneto-optical recording mediums which can be put to practical use.

Already proposed materials for magneto-optical recording mediums include TbFe disclosed in Japanese Unexamined Patent Publication (Kokai) No. 52-31703, and TbFeCo and DyFeCo, etc. disclosed in Japanese Unexamined Patent Publication (Kokai) No. 58-73746, and the like. Nevertheless, a further improvement of the reliability or durability and recording and reproducing characteristics is necessary before such magneto-optical recording mediums can be put to practical use. To this end, the provision of a transparent dielectric layer as a protecting and enhancing layer has been proposed, by which diffusion of a gas such as oxygen causing a deterioration of a recording material is prevented and an optical interference effect, i.e., multi-reflection of light, is utilized to increase the Kerr rotation angle. It is considered that nitrides, sulfides, fluorides, etc. of metals, such as $Si_3N_4$, AlN, ZnS and $MgF_2$, are preferable for the above transparent dielectric layer.

Among the above materials, the inventors investigated $Si_3N_4$ and AlN, etc., which are considered to have an excellent resistance to the environment, and found that the deposition rates thereof are low and that the formed layers have large strains therein, and particularly, when a plurality of layers are formed, peeling, etc., of the considered layer along the grooves occur in an environment test, which is another problem of reliability or durability different to that of the resistance to oxidation of a recording layer. Also, the above dielectric materials have a refractive index of only around 2.0, limiting an increase of the Kerr rotation angle to around 0.5° to 0.7°, which does not satisfy the specifications or requirements for practical mediums. Therefore, a further improvement of the reliability or durability and an increase of the Kerr rotation angle is required before these optical recording mediums can be put to practical use.

SUMMARY OF THE INVENTION

In consideration of the above, the present invention was created to provide an optical recording medium having a high reliability or durability and high recording and reproducing characteristics, by improving a transparent dielectric layer. Specifically, the first object of the present invention is to reduce the internal stress and increase the adhesivity of the dielectric layer so that, in particular, bending of the medium and cracks and peeling of the layer due to deterioration of the interface between the substrate and the dielectric layer are prevented, and defects such as pin holes are also prevented, whereby the reliability or durability of the medium is improved. The second object of the present invention is to form a dielectric layer in which the refractive index can be adjusted over a wide range at a relatively high level, so that the medium satisfies the specifications or requirements for the medium, and the Kerr rotation angle of a magneto-optical recording medium, when applicable, is increased, whereby the recording and reproducing characteristics are improved.

The above and other objects of the present invention are attained by an optical recording medium comprising, a substrate, a transparent layer as a protecting and-/or enhancing layer, and an optical recording layer, wherein said transparent layer is made of an oxide of at least one metal selected from the group consisting of indium (In), tin (Sn), and tantalum (Ta), said oxide further containing at least one element selected from the group of nitrogen (N) and bismuth (Bi).

DESCRIPTION OF THE PREFERRED EMBODIMENTS

Figure 1:
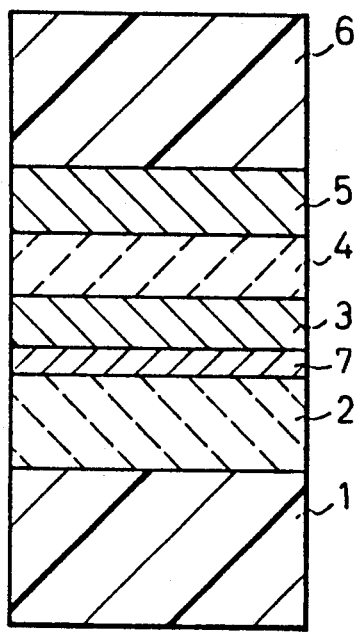
FIGS. 1 to 4 schematically show sections of magneto-optical recording mediums.

The present inventors investigated the abovementioned problems and found that a transparent dielectric layer of an oxide of In and/or Sn has a good adhesivity to polymer substrates and a good toughness, whereby cracks and peeling of the layer do not occur during the environment resistance test. Nevertheless, magneto-optical recording discs using a dielectric layer sputtered with the above oxides, more specifically, a layer of ITO (Indium-Tin-Oxide), $In_2O_3$, etc., were found to have a high noise level, and particularly when the pressure during the sputtering is lower, the noise level is higher and the stress in the layer is larger, resulting in a bending of the medium and easy formation of cracks in the layer. An X-ray analysis of the oxide layer showed that the crystallinity of the layer was higher when the gas pressure during the sputtering was lower, and thus it is considered that this crystallization of the layer has a relationship to the increase of the internal stress of the layer and the elevation of the noise level. Accordingly, the inventors tried an increase of the sputtering gas pressure, to avoid the above problems, but this reduced the density of the layer, resulting in a lowering of the protection efficiency and the optical characteristics; specifically, the refractive index and the enhancement effect of the Kerr rotation angle.

According to the present invention, by using a transparent dielectric layer of In and/or Sn oxides containing nitrogen, the internal stress of the layer, which determines the amount of bending of the medium, was remarkably lowered to less than ½ to 1/6 of that of a layer of a known oxide or nitride alone, as shown later in the Examples. As a result, cracks or peeling did not occur and substantially no pin holes were formed during a high temperature and high humidity environment test. Further, a high resistance to humidity permeation was seen. The obtained layer was amorphous, and an amorphous layer advantageously has a reduced noise level. If recording or reproducing is conducted on a medium having a crystalline layer, a laser beam is scattered by the crystal grain boundaries and the noise level is thus increased. An amorphous layer does not have a grain boundary, and thus such scattering does not occur there and the noise level is reduced. Moreover, the refractive index, which is directly related to the enhancement effect, of the layer was higher than those of original oxides such as ITO, and the barrier effect to water vapor and the like also was increased. Further, the adhesivity of the layer was as good as those of the ITO layer, etc., and far superior to those of the nitride layers such as AlSiN. The above low internal stress of the layer was obtained in a wide range of gas pressures, which is advantageous from the viewpoint of a stable production.

Also, the present inventors tried the addition of various elements having a high refractive index into a layer of In and/or Sn oxides, to improve the refractive index of the layer and the Kerr rotation angle, and surprisingly found that the oxide layer to which Bi is added is amorphous, has an internal stress lower than that of the oxide alone, allows an adjustment of the refractive index at a high level of over 2.0 in a wide range of the Bi content, and has an adhesivity as high as that of In or Sn oxide, and thus that this layer of the Bi-added In and/or Sn oxides has near ideal characteristics as the transparent dielectric layer.

Further, known In and/or Sn oxides have a high electric conductivity, which results in a high thermal conductivity contributed by the electrons, and therefore, the shape of bits during the recording is disadvantageously deformed by a thermal diffusion from portions to be recorded. Some of the inventors previously proposed an improvement of the In and/or Sn oxide layer (EP-A2-0245833, published on Nov. 19, 1987), but the above problems have not been completely solved in the proposal. It was also found that the addition of Bi caused a loss of the electric conductivity of the layer, and the thermal conductivity thereof was remarkably reduced, whereby the deformation of the bit shape was prevented. Further, it was found that, when nitrogen is contained in such a complex oxide of In and/or Sn and Bi, the refractive index thereof is increased.

Moreover, the present inventors also investigated the use of a tantalum oxide, $Ta_2O_5$, as a transparent dielectric layer, as it has a relatively high refractive index with a reasonable adhesivity to polymer substrates. Nevertheless, it was found that the formed tantalum oxide layer had a poor reliability on durability in a high temperature and high humidity environment test. Namely, during the test, cracks and peeling occurred and many pin holes were formed. It was also found that, by containing nitrogen in a tantalum oxide layer, advantageous results such as those obtained when the In and/or Sn oxides layer contains nitrogen, as described above, can be obtained. Namely, the internal stress of the dielectric layer, which determines the amount of bending of the medium, was remarkably reduced in comparison with a layer of tantalum oxide or nitride alone. In a high temperature and high humidity environment test, cracks and peeling did not occur and substantially no pin holes were formed. The barrier effect to water vapor and the like was also increased. The adhesivity of the layer was good and far superior to those of the nitride layers such as AlSiN. Further, the refractive index was high, at 2.2 to 2.3, in a wide range of the nitrogen content, and was generally little affected by the nitrogen content.

Although the nitrogen-containing oxide of In and/or Sn used in the present invention is amorphous, it may contain some microcrystallites. Preferably, however, it contains no microcrystallites. The amorphous structure of the layer is advantageous in that uniform optical characteristics of the layer, and thus a low noise level, are obtained.

The advantages mentioned above and the amorphous structure of the layer of the nitrogen-containing oxide of In and/or Sn were obtained by a nitrogen content of 1 at % or less, but the nitrogen content of the nitrogen-containing In and/or Sn oxide layer is not particularly limited. Nevertheless, the adhesivity of the layer to polymer substrates is lowered with an increase of the nitrogen content, and therefore, preferably the nitrogen content is not more than 40 at %. Also, preferably the nitrogen content is not less than 1 at %, from the viewpoint of the internal stress and refractive index. The nitrogen content is calculated based on the total atoms contained in the layer.

Note, the nitrogen may be present in the nitrogen-containing In and/or Sn oxide layer in various forms. The inventors assume that most nitrogen atoms are bound to metals and form metal nitrides but nitrogen may have free bonds not bound to any metal or have a dangling bond, and also must allow the possibility that nitrogen exists in the form of an independent molecule in the layer.

The contents of In and Sn in the nitrogen-containing In and/or Sn oxide layer are not limited, and In or Sn alone or a mixture thereof is possible in the present invention. Nevertheless, preferably the Sn does not exceed 50 at % of the total atoms of In and Sn, as an increase of the Sn content results in a slight coloration and a reduction of the transparency of the layer.

To increase the refractive index of the dielectric layer, an additive such as ZnS, $Ta_2O_5$, $TiO_2$, $ZrO_2$, $Al_2O_3$, etc., alone or in addition to Bi, as described above and below, may be added.

The complex oxide of In and/or Sn with Bi of the present invention is not particularly limited as long as it is amorphous and provides an advantageous noise level (due to the nonexistence of grain boundaries therein), a resistance to chemical corrosion and a gas barrier effect, etc. The amorphous state of the layer is obtained by a very small content of Bi of 1 at % or less, and thus there is no particular lower limitation of the Bi content when the dielectric layer is applied to a protecting layer. Nevertheless, when an improved enhancement effect, specifically an increase of the Kerr rotation angle and a confinement of a laser beam, etc., is desired, a refractive index of not less than 2.0, preferably not less than 2.10, is necessary, and a Bi content of 6 at % or more, more preferably 12 at % or more, is preferred. At such a Bi content, the thermal conductivity is also remarkably reduced and thus deformation of the shape of the recording bit is prevented.

If the Bi content is increased, however, the adhesivity of the dielectric layer to a polymer substrate is lowered and the reliability or durability of the medium as a whole is reduced. If the Bi content is too high, the refractive index of the dielectric layer may be too high, and the reflectance by the recording medium undesirably reduced to lower than the detectable level of a recording and reproducing device. Accordingly, the Bi content is preferably not more than 50 at %, more preferably not more than 40 at %.

By containing nitrogen in a layer of the complex oxide of In and/or Sn and Bi, an increase of the refractive index and other effects, similar to those obtained in the case of the nitrogen-containing In and/or Sn oxide layer, are preferably obtainable. But if the content of nitrogen is increased, the adhesivity of the layer to a polymer substrate is lowered, and therefore, a nitrogen content of 1 to 40 at % is preferable.

The content of nitrogen in the nitrogen-containing tantalum oxide layer is preferably 1 to 45 at %. The tantalum oxide layer has a brown color and disadvantageously absorbs the light of a laser beam, and a nitrogen content thereof of at least a level of 1 at % or more makes the tantalum oxide layer transparent. A higher content of the nitrogen does not cause refractive index and transparency problems but may lower the adhesivity of the layer to a substrate, particularly a synthetic resin substrate, whereby cracks and peeling can easily occur.

It was found that the addition of In and/or Sn to the nitrogen-containing tantalum oxide layer effectively increases the adhesivity of the layer to a synthetic resin substrate, and for this purpose, a content of at least one of In and Sn of only 1 at % or more is sufficient. The addition of In and/or Sn causes a lowering of the refractive index of the layer, and when used as an enhancing layer, a content of In and/or Sn of not more than 25 at %, more preferably not more than 15 at %, is preferred so that a refractive index of the transparent dielectric layer of not less than 2.0, more preferably not less than 2.1, is obtained; which index is necessary for obtaining desirable enhancement effects, more specifically an increase of the Kerr rotation angle and confinement of a laser beam.

The process for forming the transparent dielectric layer of the present invention is not limited, provided that it is a gas phase deposition of a thin layer onto a substrate, typically sputtering. In addition to sputtering, various gas phase deposition processes including PVD (physical vapor deposition) such as evaporation, ion plating, etc., and CVD (chemical vapor deposition), or the like may be used. Among the above, sputtering is preferred because it allows a high adhesivity of a deposited layer to a synthetic resin layer.

The evaporation source or target may be a metal of In, Sn, Ta or Bi, or an alloy thereof, or an oxide or a nitride thereof, or a mixture thereof, for example, InN, $In_2O_3$, SnN, SnO, ITO, $Ta_2O_5$, TaN, $Bi_2O_3$, BiN, InN/$In_2O_3$, SnN/$SnO_2$, SnN/SnO, TaN/$Ta_2O_5$, etc. The atmosphere for the deposition may be an inert gas (for example, argon), oxygen, nitrogen, or a mixture thereof, etc.

A reaction sputtering in which a target is an oxide of a metal, In and/or Sn and/or Ta, and optionally Bi, and a reaction gas atmosphere containing nitrogen, so that a nitrogen-containing metal oxide layer is deposited, is most preferable, because the deposition rate is fast, and accordingly, the productivity is high. A wide range of sputtering conditions can be adopted for a certain quality of a deposited layer, so that the production is stable, and an oxidative atmosphere does not exist, and thus it is advantageous for the successive deposition of a recording layer. Moreover, the addition of nitrogen to the atmosphere advantageously prevents an extraordinary discharge during a reaction sputtering process, whereby the sputtering is made stable and the productivity is increased.

The optical recording medium of the present invention is characterized by the above transparent dielectric layer as a protecting or light interference layer, and is not particularly limited by the other constitution, as is clear from the gist of the present invention. For example, the present invention may be applied to various types of known optical recording mediums such as light reflection recording type (for example, compact disc), phase transition recording type, and magneto-optical recording type, etc., mediums.

Nevertheless, the present invention is advantageously applied particularly to a magneto-optical recording medium, because of the characteristics of the transparent dielectric layer, an improvement of the noise level, and a large light interference effect. The magneto-optical recording mediums are described below.

The magneto-optical recording layer may be any layer which can be recorded and reproduced by the magneto-optical effect; specifically a layer having an easy magnetization axis perpendicular to the layer surface and optionally forming reverse magnetic domains so that a recording and reproducing of information can be effected through the magneto-optical effect. For example, amorphous alloy layers of rare earth element(s) and transition metal(s) such as TbFe, TbFeCo, GdFeCo, NdDyFeCo, NdDyTbFeCo, NdFe, PrFe, CeFe, etc., or garnet, or multi-layer of Pt/Co, Pd/Co etc., or the like can be used. The magneto-optical recording layer may have a multi-layer structure. A typical thickness of the magneto-optical recording layer is 10 to 150 nm.

A transparent substrate of the magneto-optical recording medium may be a synthetic resin such as polycarbonate resin, acrylic resin, epoxy resin, 4-methylpentene resin, or a copolymer thereof, or glass. Among the above, polycarbonate resin is preferably used because of its mechanical strength, weather resistance, thermal resistance, and humidity permeation resistance.

The transparent dielectric layer of the present invention is particularly advantageously used with such a synthetic resin substrate in a magneto-optical recording medium because the transparent dielectric layer has excellent characteristics such as an improved adhesivity, layer internal stress, gas barrier effect and humidity permeation resistance, etc., as described before.

In the above constitution, preferably another transparent layer of a metal or dielectric not containing oxygen is provided between the above transparent dielectric layer and the magneto-optical recording layer, from the viewpoint of resistance to oxidation and resistance to humidity permeation. Such a metal may be at least one of Ag, Cu, Au, Al, Si, Ti, Cr, Ta, Zr, Re and Nb, etc. A preferable metal is Ti or an alloy of Ti with Cr, Ta and/or Re. The thickness of this metal layer should be not more than 5 nm, and to improve the CNR (carrier to noise ratio), is preferably not more than 2 nm. Alternatively, a transparent dielectric layer not containing oxygen and acting as an oxygen barrier may be used. Such a dielectric layer includes nitride, sulfide, fluoride, and a mixture thereof, for example, $Si_3N_4$, AlN, AlSiN, TiN, TaN, NbN, and ZnS. The thickness of this layer is preferably 10 nm to 120 nm, from the viewpoint of obtaining an enough enhancement effect of the Kerr rotation angle. This second dielectric layer can be easily deposited successive to a deposition of the above transparent dielectric layer concerned. The total thickness of the transparent dielectric layer according to the present invention and the other transparent metal or dielectric layer, when applied on the substrate side of the recording layer, is typically 60 nm to 150 nm, from the viewpoint of obtaining a sufficient enhancement effect of the Kerr rotation angle. Note that a typical thickness of the transparent dielectric layer as a protecting or enhancing layer according to the present invention is 10 nm to 150 nm, preferably 60 nm to 150 nm. This transparent dielectric layer may be advantageously used, even if it has a thin thickness such as 10 nm, because when applied onto a substrate and in combination with another dielectric layer formed thereon, this layer can improve the adhesivity of the other dielectric layer to a synthetic resin substrate. Of course, by having a greater thickness, this layer can fully provide advantages such as a high refractive index, a durability under a high temperature and high humidity condition, and a high resistance to humidity permeation, etc. to a magneto-optical recording medium.

Therefore, the present invention is particularly advantageous in a magneto-optical recording medium comprising a synthetic resin substrate, a transparent dielectric layer of an oxide of at least one of In, Sn, and Ta containing at least one of N and Bi, another transparent metal or dielectric layer, and a magneto-optical recording layer, in this order. This feature is shown in FIG. 1, in which 1 denotes a substrate, 2 a transparent dielectric layer of an oxide of at least one of In, Sn, and Ta containing at least one of N and Bi, 7 another transparent metal or dielectric layer, and 3 a magneto-optical recording layer.

The present invention also can be applied to various types of constructions of magneto-optical recording mediums, with the above feature as the basis structure thereof. For example, a magneto-optical recording medium may have a rear side protecting layer opposite to the substrate side of the recording layer (e.g., a dielectric layer, an inorganic layer or an organic layer; an organic layer 6 in FIG. 1), optionally a reflecting layer 5, and/or optionally a further transparent dielectric (interference) layer 4 between the recording layer and the reflecting layer, etc. (FIG. 1), and a magneto-optical recording medium as above may be stacked with a plate or another of the same magneto-optical recording medium (not shown).

The dielectric protecting layer 2 or 4 is preferably a layer having less cracks or pin holes, to prevent a permeation of oxygen or humidity through the layer, and may be a nitride, fluoride or oxide, etc., for example, AlN, MgF$_2$, ZnS, CeF$_3$, AlF$_3$·3NaF, Si$_3$N$_4$, SiO, SiO$_2$, Zr$_2$O$_3$, In$_2$O$_3$, SnO$_2$, etc., or a mixture thereof. Particularly, a layer of an oxide of at least one of In, Sn and Ta containing at least one of N and Bi is preferable for this dielectric protecting layer, since peeling or cracks did not occur in this layer during a reliability test.

As described before, when a transparent dielectric layer of an oxide of at least one of In, Sn and Ta containing at least one of N and Bi is used as a protecting or enhancing layer, a metal or dielectric transparent barrier layer is preferably inserted between the above protecting or enhancing layer and the recording layer. This is applicable not only when the protecting or enhancing layer is disposed on the substrate side of a recording layer but also when disposed on the opposite side or both sides, for the same reason.

The reflecting layer 5 may be of any metal having a necessary light reflecting property, Al, Ag, Cu, Au, Ti, Ta, Cr, Re, Zr, Si, or an alloy thereof with other metal or metals. The reflecting layer may be deposited by vacuum deposition, sputtering, ion beam sputtering, or CVD, etc. The thickness of the reflecting layer is typically 40 nm to 100 nm.

When a reflecting layer 5 is used, a transparent dielectric layer 4 may be preferably inserted between the recording layer 3 and the reflecting layer 5, to obtain an enhancing effect. This transparent dielectric layer 4 may be of any dielectric material, including the oxide of at least one of In, Sn and Ta containing at least one of N and Bi according to the present invention and the conventional dielectric materials as mentioned above, and is preferably of a dielectric material having a high refractive index with a high protection effect. From this viewpoint, the transparent dielectric layer of the oxide of at least one of In, Sn and Ta containing at least one of N and Bi according to the present invention is preferable. The thickness of the dielectric layer 4 is typically 10 nm to 100 nm.

The organic protecting layer 6 may be various known photosensitive resins, etc., and may be applied by coating or the like. When the organic protecting layer is used, an inorganic layer as described above is preferably inserted between the organic protecting layer and the recording layer; the inorganic layer being in contact with the recording layer. The thickness of the organic protecting layer 6 is a few micrometers or more, typically a few tens of micrometers or more.

The protecting layer may be a combination of the above protecting layers. The rear side protecting layer, opposite to the substrate, is preferably formed to cover the recording layer including the side thereof.

It is clear from the characteristics, etc. of the protecting or enhancing transparent dielectric layer that the present invention may be applied to optical recording mediums other than magneto-optical recording mediums, such as a phase transition type optical recording medium.

The present invention is described further with reference to the following examples.

WORKING EXAMPLE 1

An ITON (nitrogen-containing indium tin oxide) layer was formed on a polycarbonate substrate by reactive sputtering in an RF (radio frequency) magnetron sputtering unit with a target of ITO (indium tin oxide) (SnO$_2$ content of 10 mol %), in an atmosphere of argon with nitrogen. The sputtering conditions were a sputtering gas composition of Ar/N$_2$=90/10 by volume, a sputtering gas pressure of 2 mTorr (0.27 Pa), and a sputtering power of 4 W/cm$^2$.

The nitrogen content of the resultant ITON layer was 8 at %, as determined by the Dorman method in which the temperature at the entrance of a reaction furnace was set at 900° C. When the ITON layer having a thickness of 200 nm was deposited and examined by X-ray diffraction, it was confirmed that the layer was amorphous. The internal stress of the layer was determined by a method of forming a layer on a cover glass for a microscope and measuring an amount of bending of the cover glass, followed by calculating the internal stress from the amount of bending. This method was also applied to the same ITON layer. The results are shown in Table 1.

Figure 2:
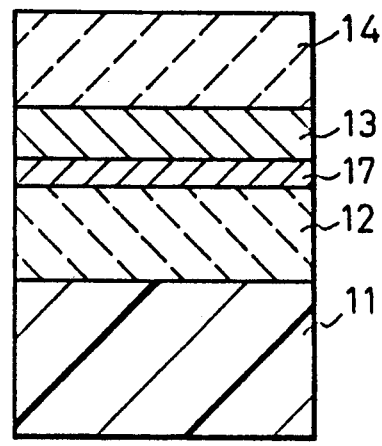

Then a magneto-optical recording medium having the same ITON layer as above as a transparent dielectric layer was manufactured and examined. FIG. 2 shows the structure of the medium, in which 11 denotes a polycarbonate substrate, 12 a transparent dielectric layer of ITON, 80 nm thick, formed by the above procedures, 17 a metal protecting layer of Ti, 2 nm thick, formed under the same sputtering conditions as above in a pure Ar atmosphere, 13 a recording layer of an amorphous alloy of $Tb_{23}Fe_{66}Co_{11}$, 40 nm thick, formed under the same sputtering conditions in a pure Ar atmosphere, and 14 a rear side protecting layer of Ti, 100 nm thick, formed under the same sputtering conditions as above in a pure Ar atmosphere.

A high temperature and high humidity test was conducted at 70° C. and 90% RH. Usually, if a recording layer (13, in this case) is oxidized, the coercive force of the recording layer 13 and the Kerr rotation angle of the medium are decreased. Nevertheless, during the above test, cracks, peeling or a reduction of the coercive force and Kerr rotation angle did not occur for more than 1000 hours. The noise level was measured under the conditions of a disc rotation of 1800 rpm, a recording frequency of 2 MHz, a location at a radius of 30 mm from the center of the disc, and an input impedance of a spectrum analyzer of 50 ohms. The result is shown in Table 1, in which the noise level is expressed by the absolute power level dBm when the basis of 0 dB is taken as 1 mW.

COMPARATIVE EXAMPLES 1-2

ITO layers, 200 nm thick, were formed in the same sputtering procedures as in Working example 1 except that an ITO target was set in an atmosphere of 100% Ar (Comparative example 1) or $Ar/O_2=90/10$ by volume (Comparative example 2).

It was confirmed by an X-ray diffraction that the resultant ITO layers were both crystalline.

The internal stress of the ITO layers and the noise level of magneto-optical recording mediums having the same ITO layers as above were determined and are shown in Table 1.

TABLE 1

| Sample | Transparent dielectric layer | Internal stress (dyn/cm$^2$) | Noise level (dBm) |
|---|---|---|---|
| Working example 1 | ITON | $-2 \times 10^9$ | −59 |
| Comparative example 1 | ITO (Ar = 100) | $-10 \times 10^9$ | −50 |
| Comparative example 2 | ITO (Ar/O$_2$ = 90/10) | $-11 \times 10^9$ | −52 |

It is seen in Table 1 that, by using the ITON layer according to the present invention, the internal stress of the layer and the noise level of the medium are improved in comparison with the case of using the ITO layer.

Moreover, the surfaces of the ITON and ITO layers were observed by a scanning tunnel microscope (STM) and a transmission electron microscope (TEM) and it was confirmed that the surface of the ITON layer was quite smooth but the surface of the ITO layer was rough.

WORKING EXAMPLES 2-3

A nitrogen-containing $In_2O_3$ (ION) layer (Working example 2) and an ITON layer having a nitrogen content different from that of Working example 1 (Working example 3) were formed on a polycarbonate substrate by reaction sputtering with a target of $In_2O_3$ or ITO (10 mol % $SnO_2$), respectively, in a nitrogen atmosphere. The sputtering conditions were a sputtering gas composition of $Ar/N_2=50/50$ by volume, a sputtering gas pressure of 2 mTorr (0.27 Pa), and a sputtering power of 6 W/cm$^2$.

As determined by the Dorman method, the nitrogen contents of the resultant layers were 10 at % for the ION layer and 9 at % for the ITON layer, and the oxygen contents thereof were 50 at % for the ION layer and 51 at % for the ITON layer. It was confirmed that both layers were amorphous. The results of an examination of the internal stress of the layers are shown in Table 2.

Magneto-optical recording mediums having the same structure as that in Example 1 and shown in FIG. 2, except that the transparent dielectric layer 12 was replaced by the ION layer (Working example 2) or the ITON layer (Working example 3), were manufactured and examined.

Namely, high temperature and high humidity tests at 70° C. and 90% RH were carried out for the above two mediums. The coercive force and the Kerr rotation angle were not reduced and cracks and peeling did not occur even after more than 500 hours. Also, no bending of the mediums was observed.

COMPARATIVE EXAMPLES 3-4

For comparison with Working examples 2 and 3, an AlN layer (Comparative example 3) and an SiN layer (Comparative example 4) were formed under the same conditions as in Working examples 2 and 3 and the internal stresses thereof were determined. Thereafter, magneto-optical recording mediums having the same structure as that used in Working example 2 or 3 except that the above ION or ITON layer was replaced by the AlN or SiN layer, were manufactured. Then a high temperature and high humidity test under the same conditions as those for Working example 2 or 3 was carried out on Comparative examples 3 and 4, and a deterioration of the characteristics, i.e., a lowering of the coercive force and Kerr rotation angle, was observed after about 50 hours. The internal stresses determined are shown in Table 2.

TABLE 2

| Sample | Transparent dielectric layer | Internal stress (dyn/cm$^2$) |
|---|---|---|
| Working example 2 | ION | $-2.9 \times 10^9$ |
| Working example 3 | ITON | $-2.3 \times 10^9$ |
| Comparative example 3 | AlN | $-7.0 \times 10^9$ |
| Comparative example 4 | SiN | $-14.2 \times 10^9$ |

WORKING EXAMPLE 4

An ION layer similar to that of Working example 3 was formed in the following manner.

The ION was formed on a carbonate substrate by RF magnetron sputtering using a target of a sintered InO/InN (50/50 mole %). The other conditions for sputtering were, a sputtering gas pressure of 2 mTorr (0.27 Pa), a sputtering power of 3 W/cm$^2$, and a sputtering gas of $Ar/N_2=50/50$ by volume.

The same medium as that in Working example 1 and shown in FIG. 2, except that the above ION layer was used as the transparent dielectric layer 12 was manufactured. The used sputtering gas was pure Ar, except when depositing the ION layer. The same high humidity and high temperature test as for Working examples 2 and 3 was carried out for this medium. It was confirmed that the coercive force and Kerr rotation angle were not reduced, and cracks and peeling were not observed for more than 1000 hours.

WORKING EXAMPLES 5-7 AND COMPARATIVE EAXMPLE 5

Transparent dielectric layers of nitrogen-containing indium oxide (ION) to which another transparent dielectric material having a high refractive index had been added were formed on a slide glass by RF magnetron sputtering using a sintered target of In (99.9% purity) alone (Working example 5) or with 40 mol % of ZnS (99.9% purity) or $Ta_2O_5$ (99.9% purity). The sputtering conditions were a sputtering gas pressure of 10 mTorr (1.33 Pa), a sputtering power of 3 $W/cm^2$, and a sputtering gas of $Ar/N_2=60/40$ by volume. The refractive indexes of the resultant layers are shown in Table 3.

For comparison, a transparent dielectric layer of $In_2O_3$ was formed on a slideglass by the same procedures as in Working example 5 except that the atmosphere was 100% Ar. The refractive index of the deposited layer is shown in Table 3.

Magneto-optical recording mediums similar to that of Working example 1 and shown in FIG. 2 were manufactured by forming the above transparent dielectric layer 12, 70 nm thick, on a 5.25 inch disc polycarbonate substrate 11 under the same conditions as above, followed by successively depositing a metal layer 17 of a TiRe alloy, 1.5 nm thick, from targets of $Ti_{50}Re_{50}$ and then a recording layer a $Tb_{23}Fe_{66}Co_{11}$ alloy, 80 nm thick, respectively, in a pure Ar gas atmosphere, under a pressure of 10 mTorr and at a power of 3 $W/cm^2$. Then, a rear side protecting layer 14 was formed by depositing a transparent dielectric layer, 70 nm thick, in the same manner as the above, on the recording layer.

The reflectance of the manufactured mediums were determined by a semiconductor laser pick up at a wavelength of 830 nm. The results are also shown in Table 3.

TABLE 3

| Sample | Target (mole ratio in parenthesis):Atmosphere | Refractive index (at 830 nm) | Reflectance (%) |
|---|---|---|---|
| Working example 5 | $In_2O_3:N_2/Ar$ | 2.07 | 25 |
| Working example 6 | $In_2O_3—ZnS$ (60/40):$N_2/Ar$ | 2.17 | 21 |
| Working example 7 | $In_2O_3—Ta_2O_5$ (60/40):$N_2/Ar$ | 2.15 | 22 |
| Comparative example 5 | $In_2O_3:Ar$ | 2.00 | 28 |

It can be seen from Table 3 that the simple nitrogen-containing In oxide layer (Working example 5) and the nitrogen-containing In oxide layer to which a high refractive index dielectric materials (Working examples 6 and 7) were added, allow an increase of the refractive index of the layer and a lowering of the reflectance of the medium in comparison with the known In oxide layer. These effects are particularly remarkable in Working examples 6 and 7.

WORKING EXAMPLE 8

A medium similar to that shown in FIG. 3 except that the metal layer 18 was eliminated was manufactured in the following manner. On a 5.25 inch disc polycarbonate substrate 11, a transparent dielectric layer 12 of a nitrogen-containing ITO (ITON) was formed by RF magnetron sputtering using an ITO target ($SnO_2$ content 20 mol %). The conditions of the sputtering were a sputtering gas pressure of 10 mTorr (1.33 Pa), a sputtering power of 3 $W/cm^2$ and a sputtering gas of $Ar/N_2=70/30$ by volume. Then, a metal layer a TiCrRe alloy, 1.5 nm thick, and then a recording layer 13 of an NdDyFeCo alloy, 20 nm thick, were successively deposited by RF magnetron sputtering using a target of a $Ti_{60}Cr_{30}Re_{10}$ alloy and a target of a $Nd_5Dy_{15}Tb_8Fe_{60}Co_{12}$ alloy respectively, in 100% Ar, under a pressure of 10 mTorr (1.33 Pa) and at a power of 3 $W/cm^2$.

As a rear side protecting layer, a second transparent dielectric layer 14, 30 nm thick, and the same as the layer 12 was first deposited on the recording layer 13 by the same procedures for the layer 12 using a target of ITO ($SnO_2$ content 20 mol %). A metal layer 15, 50 nm thick and the same as the layer 17, was then deposited on the second transparent dielectric layer 14 by the same procedures for the layer 17 (FIG. 3). Namely, the rear side protecting layer comprised two sublayers 14 and 15, by which utilization of the Faraday effect can be obtained.

This magneto-optical recording medium had a reflectance of 12% and a low noise level of −59 dBm.

EXPERIMENTS 1-7

A slideglass having a length of 76 mm, a width of 26 mm and a thickness of 1 mm, a 1 cm square silicon wafer having a thickness of 1 mm, and a thin glass disc having a diameter of 18 mm and a thickness of 0.1 mm were set in a vacuum chamber of a RF magnetron sputtering unit SPF-430H type (ANELVA Corporation) with three targets and the chamber was evacuated to $4 \times 10^{-7}$ Torr ($5.33 \times 10^{-5}$ Pa).

An $Ar/O_2$ gas ($O_2$ 1 vol %) was then introduced into the chamber, and the flow rate of the $Ar/O_2$ gas was adjusted to establish a pressure of 10 mTorr (1.33 Pa) in the chamber. The target was a disc 10 mm in diameter and 5 mm thick and a sintered oxide having a composition of $Bi_xIn_ySn_zO_{100-(x+y+z)}$ [x, y and z are expressed by atom %] where (x, y, z) is (34, 6, 0), (28, 12, 0), (20, 20, 0), (12, 28, 0), (6, 34, 0), (22, 14, 4), or (22, 4, 14), respectively. An RF magnetron sputtering was carried out at a discharge power of 100 W and a discharge frequency of 13.56 MHz, to obtain a complex oxide (BiInSnO) layer having a composition shown in Table 4 and a thickness of 100 nm.

First, the refractive index of the deposited layer was determined by the sample on the Si wafer with a light having a wavelength of 830 nm. The apparatus used for the measurement was an Automatic Elipsometer DHA-OLW (Mizoziri OPT. CO., LTD.). The results are shown in Table 4.

Then, the internal stress of the layer was determined by the sample formed on the thin glass disc. An amount of bending of the deposited layer was measured by scanning a probe for 2 mm with a probe type surface roughness meter, alphastep 200 (Tencor Instruments), and the internal stress $\sigma$ was calculated from the amount of bending. The results are shown in Table 4.

Further, the crystallinity of the deposited layer was analyzed on the sample formed on the slideglass by a X-ray Analyzer. The X-ray analyzer was a high power X-ray diffraction unit HIGHPOWER UNIT MODEL D-3F (Rigaku Industrial Corporation). The crystalline states are shown in Table 4.

EXPERIMENTS 8-14

As in Experiments 1-7, a slideglass having a length of 76 mm, a width of 26 mm, and a thickness of 1 mm, a 1 cm square Si wafer having a thickness of 1 mm, and a thin glass disc having a diameter of 18 mm and a thickness of 0.1 mm, were set in a vacuum chamber of a RF/DC magnetron sputtering unit SPF-430H type (ANELVA Corporation) with three targets, and the chamber was evacuated to $4 \times 10^{-7}$ Torr ($5.33 \times 10^{-5}$ Pa).

Under the same conditions as in Experiments 1-7, except that the sputtering gas was Ar/N$_2$ (N$_2$30 vol %), nitrogen-containing complex oxide (BiInSnON) layers having a composition as shown in Table 4 and a thickness of about 100 nm were deposited. The refractive index, internal stress $\sigma$ and crystalline state of the deposited layers were examined and the results are shown in Table 4.

EXPERIMENT 15

As in Experiments 1-7, a slideglass having a length of 76 mm, a width of 26 mm and a thickness of 1 mm, a 1 cm square Si wafer having a thickness of 1 mm, and a thin glass disc having a diameter of 18 mm and a thickness of 0.1 mm, were set in a vacuum chamber of a RF/DC magnetron sputtering unit SPF-430H type (ANELVA Corporation) with three targets, and the chamber was evacuated to $4 \times 10^{-7}$ Torr ($5.33 \times 10^{-5}$ Pa).

A complex oxide layer having a composition of Bi$_{24}$In$_{16}$O$_{60}$ and a thickness of about 100 nm was deposited by DC reactive sputtering. The target was an alloy of Bi$_{60}$In$_{40}$, the sputtering gas was an Ar/O$_2$ gas mixture (O$_2$: 10 vol %), the discharge voltage was 400 V and the discharge current was 0.5 A.

The refractive index, internal stress $\sigma$ and crystalline state of the deposited layers were examined and the results are shown in Table 4.

EXPERIMENTS 16 AND 17

For comparison, known In$_2$O$_3$ and Bi$_2$O$_3$ layers were formed and evaluated as below.

As in Experiments 1-7, a slideglass having a length of 76 mm, a width of 26 mm, and a thickness of 1 mm, a 1 cm square Si wafer having a thickness of 1 mm, and a thin glass disc having a diameter of 18 mm and a thickness of 0.1 mm, were set in a vacuum chamber of a RF magnetron sputtering unit SPF-430H type (ANELVA Corporation) with three targets, and the chamber was evacuated to $4 \times 10^{-7}$ Torr ($5.33 \times 10^5$ Pa).

The In$_2$O$_3$ and Bi$_2$O$_3$ layers having a thickness of about 100 nm were deposited under the same conditions as in Experiments 1-7 except that a sintered target of In$_2$O$_3$ or Bi$_2$O$_3$ was used respectively. The refractive index, internal stress $\sigma$ and crystalline state of the layers were examined and the results are shown in Table 4.

TABLE 4

| Sample | Composition of layer | Refractive index | Internal stress ($\times 10^9$ dyn/cm$^2$) | Crystalline state |
| --- | --- | --- | --- | --- |
| Experiment 1 | Bi$_{34}$In$_6$O$_{60}$ | 2.40 | <0.5 | Amorphous |
| Experiment 2 | Bi$_{28}$In$_{12}$O$_{60}$ | 2.30 | <0.5 | Amorphous |
| Experiment 3 | Bi$_{20}$In$_{20}$O$_{60}$ | 2.20 | <0.5 | Amorphous |
| Experiment 4 | Bi$_{12}$In$_{28}$O$_{60}$ | 2.10 | <0.5 | Amorphous |
| Experiment 5 | Bi$_6$In$_{34}$O$_{60}$ | 2.00 | <0.5 | Amorphous |
| Experiment 6 | Bi$_{22}$In$_{14}$Sn$_4$O$_{60}$ | 2.25 | <0.5 | Amorphous |
| Experiment 7 | Bi$_{22}$In$_4$Sn$_{14}$O$_{60}$ | 2.25 | <0.5 | Amorphous |
| Experiment 8 | Bi$_{34}$In$_6$O$_{50}$N$_{10}$ | 2.45 | <0.5 | Amorphous |
| Experiment 9 | Bi$_{28}$In$_{12}$O$_{50}$N$_{10}$ | 2.35 | <0.5 | Amorphous |
| Experiment 10 | Bi$_{20}$In$_{20}$O$_{50}$N$_{10}$ | 2.25 | <0.5 | Amorphous |
| Experiment 11 | Bi$_{12}$In$_{28}$O$_{50}$N$_{10}$ | 2.15 | <0.5 | Amorphous |
| Experiment 12 | Bi$_6$In$_{34}$O$_{50}$N$_{10}$ | 2.05 | <0.5 | Amorphous |
| Experiment 13 | Bi$_{22}$In$_{14}$Sn$_4$O$_{50}$N$_{10}$ | 2.30 | <0.5 | Amorphous |
| Experiment 14 | Bi$_{22}$In$_4$Sn$_{14}$O$_{50}$N$_{10}$ | 2.30 | <0.5 | Amorphous |
| Experiment 15 | B$_{24}$In$_{16}$O$_{60}$ | 2.25 | <0.5 | Amorphous |
| Experiment 16 | In$_2$O$_3$ | 1.90 | 5 | Cubic In$_2$O$_3$ |
| Experiment 17 | Bi$_2$O$_3$ | 2.50 | 1 | Cubic $\delta$-Bi$_2$O$_3$ |

From Table 4, particularly Experiments 1-7, 15 and 16, it can be seen that the complex oxide layers relating to the present invention have a wide range of a refractive index above 2.0 depending on the Bi content and the internal stresses $\sigma$ of the complex oxide layers were remarkably reduced compared to that of the In$_2$O$_3$ layer, regardless of the Bi content. The internal stresses $\sigma$ of the complex oxide layers were also lower than that of the Bi$_2$O$_3$ layer. Accordingly, the lowering of the internal stress of the complex oxide layers is unexpectedly obtained by a combination of In and/or Sn oxide with Bi oxide, not by a mere addition of the internal stresses of the In and/or Sn oxide and the Bi oxide. As a result, it can be expected that, by using these complex oxide layer as a transparent dielectric layer in a magneto-optical recording medium, the effect of a confinement of a laser light is increased, and therefore, the recording sensitivity and the CNR (carrier to noise ratio) are improved. Also, a prevention of peeling and cracks is expected.

As seen in Experiments 8-14, the refractive index was further improved by again containing nitrogen in the complex oxide layer.

As seen in Experiments 16 and 17, the known layers of Bi$_2$O$_3$ and In$_2$O$_3$ respectively are crystalline, but it was surprisingly found that the complex oxide layers of the present invention are amorphous. Therefore, it is expected that the noise of the recording medium will be reduced because a scattering of a laser beam at the crystal grain boundaries during recording and reproducing and a deformation of the bit shape due to nonuniform thermal conduction when recording are small.

WORKING EXAMPLES 9-15

Magneto-optical recording mediums as shown in FIG. 2 were manufactured.

A polycarbonate disc substrate provided with 1.6 μm pitch grooves and having a diameter of 130 mm and a thickness of 1.2 mm was set in a vacuum chamber of an RF magnetron sputtering unit SPF-430H type (ANELVA Corporation) with three targets and the chamber was evacuated to $4 \times 10^{-7}$ Torr ($5.33 \times 10^5$ Pa). During the deposition, the substrate was rotated at 15 rpm.

In the same procedures as in Experiments 1-7, transparent dielectric layers 12 of complex oxides with different Bi contents were formed on the substrate 11. The compositions and thicknesses of the resultant layers are shown in Table 5. Here, the thickness of each layer shown in Table 5 was such that the efficiency index $R \cdot \theta_k$ (where R stands for a reflectance of a medium and $\theta_k$ stands for a Kerr rotation angle) which index was optically determined from the refractive index of the dielectric layer 12, is the largest, and the CNR of an actual medium becomes the largest, when varying the thickness of the dielectric layer 12.

Next, a transparent alloy layer 17 of a TiCr alloy, about 1.5 nm thick, was deposited by RF magnetron sputtering under the same conditions as above, except that the target was a disc of $Ti_{80}Cr_{20}$ alloy and the sputtering gas was pure Ar (5 nines: hereinafter abbreviated as 5N).

Then, a magneto-optical recording layer 13 of a TbFeCo alloy, about 40 nm thick, was deposited by RF magnetron sputtering under the same conditions as for the TiCr layer 17, except that the target was changed to a disc of $Tb_{23}Fe_{69}Co_8$.

Further, a rear side protecting layer 14 of a TiCr alloy, about 50 nm thick, was deposited by the same procedures as for the TiCr layer 17.

In the above procedures, magneto-optical recording mediums having a stack structure of PC/[$Bi_xIn_ySn_zO_{100-(x+y+z)}$]/TiCr/TbFeCo/TiCr as shown in FIG. 2 and having a transparent dielectric layer of complex oxides with different Bi contents, were obtained.

The Kerr rotation angles of the mediums, measured with a light having a wavelength of 633 nm, are shown in Table 5. Also, the CNR of the mediums was measured. The measurement was made by recording, reproducing, and erasing the medium at a location 30 mm from the center of the disc, the disc being rotated at a speed of 1800 rpm, in a magneto-optical recording and reproducing unit Nakamichi OMS-1000 Type III. The reproduction of information was made at a laser power of 0.8 mW. The optimum laser power for recording was at a value such that the difference between the first and second harmonic waves during the reproduction of information becomes largest at that power. The frequency of the information was 1 MHz. The optimum laser power for each medium is shown in Table 5. The applied magnetic field during the recording and erasing was 500 Oe (Oersted). The obtained CNR and noise level of the mediums are shown in Table 5.

The mediums were observed but defects such as pin holes and cracks were not found.

The mediums were then tested by being placed under a high temperature and high humidity atmosphere of 80° C. and 85% RH for 1000 hours. Thereafter, the Kerr rotation angle, optimum laser power for recording, CNR and noise level were measured, and no differences from those before the test were found. Defects such as pin holes and cracks were not found.

WORKING EXAMPLES 16-22

Magneto-optical recording mediums having a nitrogen-containing complex oxide layer as in Experiments 8-14, as a transparent dielectric layer and a structure as shown in FIG. 2 were manufactured and evaluated.

A polycarbonate resin disc substrate 11 with 1.6 μm pitch grooves and having a diameter of 130 mm and a thickness of 1.2 mm was set in the same sputtering unit as used in Working example 9-15.

The same procedures as for Working examples 9-15 were repeated except that the sputtering gas was $Ar/N_2$ ($N_2$: 30 vol %), and magneto-optical recording mediums having a structure of PC/[$Bi_xIn_ySn_z(O_{10.0-a}N_a)_{100-(x+y+z)}$]/TiCr/TbFeCo/TiCr and having a transparent dielectric layer 12 with a composition and a thickness thereof shown in Table 5, were obtained.

The thickness of the dielectric layer 12 of the mediums was selected in the same manner as in Working examples 9-15.

The Kerr rotation angle, recording power, CNR and noise level of the mediums were measured in the same manner as in Working examples 9-15. The results are shown in Table 5.

The mediums were observed, and examined such as pin holes and cracks were not found.

The mediums were then tested by being placed under a high temperature and high humidity atmosphere of 80° C. and 85% RH for 1000 hours. Thereafter, the Kerr rotation angle, optimum laser power for recording, CNR and noise level were measured and no differences from those before the test were found. Defects such as pin holes and cracks were not found.

WORKING EXAMPLE 23

A magneto-optical recording medium having a structure as shown in FIG. 2 and having as the transparent dielectric layer 12 a complex oxide layer the same as in Experiment 15 was manufactured.

A polycarbonate resin disc substrate having a diameter of 130 mm and a thickness of 1.2 mm, and provided with 1.6 μm pitch grooves, was set in the same sputtering unit as in Working examples 9-15.

The complex oxide layer of the dielectric layer 12 was formed as in Experiment 15. Namely, the target was an alloy of $Bi_{60}In_{40}$, the sputtering gas was $Ar/O_2$ ($O_2$: 10 vol %), the discharge voltage was 400 V, the discharge current was 0.5 A, and the sputtering was a DC reaction sputtering. The deposited layer was $Bi_{2.4}In_{16}O_{60}$ and had a thickness of about 72 nm. This thickness was selected in the same manner as for Working examples 9-15. The other procedures were the same as in Working examples 9-15. Thus, a magneto-optical recording medium having a structure of PC/$Bi_{24}In_{16}O_{60}$/TiCr/TbFeCo/TiCr was obtained.

The Kerr rotation angle, recording power, CNR and noise level of the medium were examined. The results are shown in Table 5.

Observation of the surface of the medium showed no defects such as pin holes, peeling and cracks.

The medium was then placed in a high temperature and high humidity atmosphere of 80° C. and 85% RH for 1000 hours. Thereafter, the Kerr rotation angle, optimum recording laser power, CNR and noise level of the medium were examined, and it was found that no change from before the placing had occurred. Defects such as pin holes, peeling and cracks were not observed.

COMPARATIVE EXAMPLE 6

A magneto-optical recording medium having a structure as shown in FIG. 2 and having a conventional $In_2O_3$ as the transparent dielectric layer 12 was manufactured.

A polycarbonate resin disc substrate 11 having a diameter of 130 mm and a thickness of 1.2 mm and provided with 1.6 $\mu$m pitch grooves was set in the same sputtering unit as in working examples 9–15.

The $In_2O_3$ layer of the dielectric layer 12 having a thickness of 80 nm was formed by the same procedures as in Experiment 16, using a sintered target of $In_2O_3$, and the other layers were formed by sputtering under the same conditions as in Working examples 9–15. Accordingly a magneto-optical recording medium having a structure of $PC/In_2O_3/TiCr/TbFeCo/TiCr$ was obtained. The thickness of the $In_2O_3$ layer was selected in the same manner as for Working examples 9–15.

In the same manner as in Working examples 9–15, the Kerr rotation angle, recording power, CNR and noise level of the medium were examined. The results are shown in Table 5. Observation of the surface of the medium showed no defects such as pin holes, peeling and cracks.

The medium was then placed in a high temperature and high humidity atmosphere of 80° C. and 85% RH. Thereafter, the Kerr rotation angle, optimum recording laser power, CNR, and noise level of the medium were examined. The results are shown in Table 5. It is seen that all of the Kerr rotation angle, recording sensitivity, CNR, and noise level of the medium were lower. Also, pin holes were observed on the surface of the medium.

1.6 $\mu$m pitch grooves was set in the same sputtering unit as in Working examples 9–15.

First, a nitrogen-containing complex oxide layer was formed as the dielectric layer 12 on the substrate 11. An $Ar/N_2$ gas ($N_2$: 30 vol %) was introduced into a vacuum chamber and the flow rate of the $Ar/N_2$ gas was adjusted so that the pressure in the chamber was 10 mTorr. The target used was a sintered disc target having a composition of $Bi_{20}In_{18}Sn_2O_{60}$, a diameter of 100 mm, and a thickness of 5 mm. An RF sputtering was carried out at a discharge power of 100 W and a discharge frequency of 13.56 MHz. Thus, a dielectric layer 12 having a composition of $Bi_{20}In_{18}Sn_2O_{50}N_{10}$ and a thickness of about 50 nm was deposited. This thickness was selected in the same manner as in Working examples 9–15.

Then, the sputtering gas was changed from the $Ar/N_2$ to pure Ar (5N), an alloy target of $Ti_{60}Cr_{30}Re_{10}$ or $Nd_5Dy_{15}Tb_8Fe_{60}Co_{12}$ was used, and the sputtering was carried out under the same conditions as above, whereby a metal layer 17 of TiCrRe having a thickness of 1.5 nm, a magneto-optical recording layer 13 of NdDyTbFeCo having a thickness of 20 nm and a rear side metal protecting layer 18 of TiCrRe having a thickness of 1.5 nm were deposited in this order.

Again, the target was changed to the sintered $Bi_{20}In_{18}Sn_2O_{60}$ target used for the dielectric layer 12 and sputtering was carried out under the same conditions as for the dielectric layer 12, whereby a rear side dielectric protecting layer 14 of BiInSnON having a thickness of about 20 nm was deposited.

Finally, the target was changed to the $Ti_{60}Cr_{30}Re_{10}$ target used for the metal layer 17 and the rear side metal protecting layer 18, and sputtering was carried out under the same conditions as for the metal layer 17, whereby a metal reflecting layer 15 of TiCrRe having a thickness of about 50 nm was deposited.

TABLE 5

| Sample | | Dielectric layer 12 | Thickness of layer d (Å) | Kerr rotation angle $\theta_k$ (°) | Recording power (mW) | CNR (dB) | Noise level (dBm) |
|---|---|---|---|---|---|---|---|
| Working example 9 | | $Bi_{34}In_6O_{60}$ | 650 | 1.00 | 4.5 | 55.0 | −60.0 |
| Working example 10 | | $Bi_{28}In_{12}O_{60}$ | 700 | 0.90 | 5.0 | 54.0 | −59.0 |
| Working example 11 | | $Bi_{20}In_{20}O_{60}$ | 750 | 0.80 | 5.5 | 53.0 | −58.0 |
| Working example 12 | | $Bi_{12}In_{28}O_{60}$ | 750 | 0.70 | 5.5 | 53.0 | −58.0 |
| Working example 13 | | $Bi_6In_{34}O_{60}$ | 800 | 0.60 | 6.0 | 52.0 | −57.0 |
| Working example 14 | | $Bi_{22}In_{14}Sn_4O_{60}$ | 720 | 0.85 | 5.2 | 53.5 | −58.5 |
| Working example 15 | | $Bi_{22}In_4Sn_{14}O_{60}$ | 720 | 0.85 | 5.2 | 53.5 | −58.5 |
| Working example 16 | | $Bi_{34}In_6O_{50}N_{10}$ | 630 | 1.05 | 4.2 | 55.5 | −60.5 |
| Working example 17 | | $Bi_{28}In_{12}O_{50}N_{10}$ | 680 | 0.95 | 4.7 | 54.5 | −59.5 |
| Working example 18 | | $Bi_{20}In_{20}O_{50}N_{10}$ | 720 | 0.85 | 5.2 | 53.5 | −58.5 |
| Working example 19 | | $Bi_{12}In_{28}O_{50}N_{10}$ | 720 | 0.75 | 5.2 | 53.5 | −58.5 |
| Working example 20 | | $Bi_6In_{34}O_{50}N_{10}$ | 780 | 0.65 | 5.7 | 52.5 | −57.5 |
| Working example 21 | | $Bi_{22}In_{14}Sn_4O_{50}N_{10}$ | 700 | 0.90 | 5.0 | 54.0 | −59.0 |
| Working example 22 | | $Bi_{22}In_4Sn_{14}O_{50}N_{10}$ | 700 | 0.90 | 5.0 | 54.0 | −59.0 |
| Working example 23 | | $Bi_{24}In_{16}O_{60}$ | 720 | 0.85 | 5.2 | 53.5 | −58.5 |
| Comparative example 5 | Before placing | $In_2O_3$ | 800 | 0.55 | 6.0 | 51.0 | −56.0 |
| | After placing | $In_2O_3$ | 800 | 0.50 | 7.0 | 49.0 | −54.0 |

WORKING EXAMPLE 24

Figure 3:
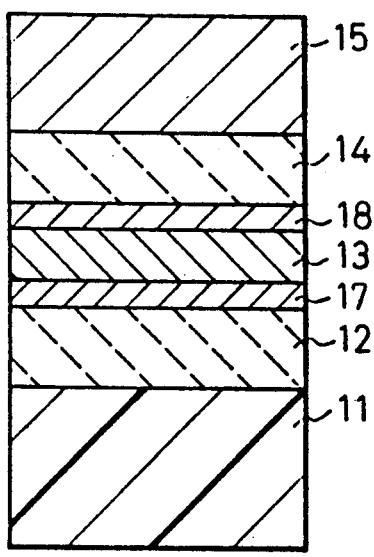

A magneto-optical recording medium having a metal reflecting layer utilizing the Faraday effect as shown in FIG. 3, in which layers 11, 12, and 13 are the same as in FIG. 2, layers 18 and 14 are rear side protecting layers, and layer 15 is a metal reflecting layer.

A polycarbonate resin substrate 11 having a diameter of 130 mm and a thickness of 1.2 mm and provided with The reflectance of the obtained medium was determined with a laser light having a wavelength of 830 nm, and was found to be 13%. The noise level of the medium was determined and was low, at −59 dBm.

From Working examples 9–15 and Comparative example 5, it was confirmed that increases of the Kerr rotation angle, recording sensitivity and CNR and a lowering of the noise level, of a magneto-optical recording medium can be obtained by using a complex oxide of In and/or Sn with Bi as a dielectric layer, which was expected from the characteristics seen in Experiments 1-17.

Namely, an increase of the refractive index of the dielectric layer by the complex oxide layer causes an increase of a light interference effect, specifically the effect of confinement of a laser beam, whereby the Kerr rotation angle, recording sensitivity, and CNR are improved. Also, as seen in Experiments 1-15, the complex oxide layers of the transparent dielectric layer in Working examples 9-23 were amorphous, which suggests a prevention of a scattering of a laser beam at the crystal grain boundaries and deformation of a bit shape by a nonuniform thermal conduction at the crystal grain boundaries, in comparison with the dielectric layer of $In_2O_3$ or $Bi_2O_3$ alone, which is crystalline, whereby a lowering of the noise level of the medium is expected. In practice, the noise level was remarkably lowered, specifically by 1-4 dB, in Working examples 9-23, in comparison with Comparative example 5.

It is also noted that the above effects are further improved by containing nitrogen in the complex oxide layer, which is shown in Working examples 16-22.

It is further noted that, in an accelerated aging test at a high temperature and high humidity, no peeling or cracks due to internal stress of the dielectric layer were found and thus an improvement of the reliability of the medium is suggested.

EXPERIMENTS 18-30

Transparent dielectric layers were formed on substrates and evaluated as shown below:

A polycarbonate disc substrate having a diameter of 130 mm and a thickness of 1.2 mm and provided with 1.6 μm pitch grooves, an Si wafer of a square of 10 mm × 10 mm, a slideglass having a length of 76 mm, a width of 26 mm and a thickness of 1 mm, and a thin glass disc sheet having a diameter of 18 mm and a thickness of 0.1 mm, were set in a vacuum chamber of an RF magnetron sputtering unit SPF-430 H type (ANELVA Corporation) having three targets and the chamber was evacuated to $4 \times 10^{-7}$ Torr ($5.33 \times 10^{-5}$ Pa).

A gas mixture of $Ar/N_2$ was then introduced into the chamber and the flow rate of the $Ar/N_2$ was adjusted so that the pressure in the chamber was 5 mTorr (0.67 Pa). The target was a sintered disc of $Ta_2O_3$ having a diameter of 100 mm and a thickness of 5 mm, on which an adequate number of sintered chips of $In_2O_3$ or $SnO_2$ were arranged when necessary. An RF sputtering was carried out at a discharge power of 100 W and a discharge frequency of 13.56 MHz. The composition of the deposited layer was controlled by controlling a nitrogen partial pressure in $Ar/N_2$ mixture. Thus, nitrogen-containing Ta oxide layers having a composition as shown in Table 6 and a thickness of about 100 nm were obtained.

The refractive index, internal stress $\sigma$, and crystalline state of the deposited layers were evaluated in the same manner as used in Experiments 1-7. The results thereof are shown in Table 6.

The adhesivity of the deposited layers to the PC disc substrate was evaluated by the samples deposited on the PC disc substrate. A cellophane adhesive tape JIS Z1522 (Sekisui Chemical Co., Ltd.) was adhered to the surface of the deposited layer and peeled in a direction parallel to the surface of the substrate, and peeling of the deposited layer was observed by the naked eye and a microscope. The results are shown in Table 6. In this regard, the following marks are used in the Table.

⊚: Good adhesivity and no peeling.
○: Peeling at only a few grooves, detected by a microscope.
x: Peeling of whole layer

EXPERIMENTS 31-33

Known layers of $Ta_2O_5$, ZnS and AlN were formed and evaluated for comparison.

As in Experiments 18-30, a PC disc substrate, an Si wafer, a slide glass, and a thin glass disc sheet were set in a vacuum chamber of the same RF sputtering unit and the chamber was evacuated to $4 \times 10^{-7}$ Torr ($5.33 \times 10^{-5}$ Pa).

The same RF magnetron sputtering as in Experiments 18-30 was carried out, and the target was a sintered target of $Ta_2O_5$, ZnS or AlN used in combination with a sputtering gas of $Ar/O_2$, pure Ar (5 N) and $Ar/N_2$, respectively.

Samples were thus-formed and the refractive index, internal stress and crystalline state thereof were evaluated. The results are shown in Table 6.

TABLE 6

| Sample | Composition of layer (at %) | Refractive index | Internal stress $\sigma$ ($\times 10^9$ dyn/cm$^2$) | Crystalline state | Adhesivity |
|---|---|---|---|---|---|
| Experiment 18 | $Ta_{28}O_{71}N_1$ | 2.35 | 2.0 | Amorphous | ○ |
| Experiment 19 | $Ta_{28}O_{62}N_{10}$ | 2.30 | 2.7 | Amorphous | ○ |
| Experiment 20 | $Ta_{28}O_{42}N_{30}$ | 2.28 | 2.8 | Amorphous | ○ |
| Experiment 21 | $Ta_{28}O_{27}N_{45}$ | 2.27 | 3.5 | Amorphous | ○ |
| Experiment 22 | $Ta_{27}In_1O_{27}N_{45}$ | 2.27 | 3.5 | Amorphous | ⊚ |
| Experiment 23 | $Ta_{18}In_{10}O_{27}N_{45}$ | 2.20 | 3.3 | Amorphous | ⊚ |
| Experiment 24 | $Ta_{13}In_{15}O_{27}N_{45}$ | 2.15 | 3.0 | Amorphous | ⊚ |
| Experiment 25 | $Ta_3In_{25}O_{27}N_{45}$ | 2.08 | 2.8 | Amorphous | ⊚ |
| Experiment 26 | $Ta_{27}Sn_1O_{27}N_{45}$ | 2.27 | 3.6 | Amorphous | ⊚ |
| Experiment 27 | $Ta_{18}Sn_{10}O_{27}N_{45}$ | 2.21 | 3.1 | Amorphous | ⊚ |
| Experiment 28 | $Ta_{13}Sn_{15}O_{27}N_{45}$ | 2.13 | 3.1 | Amorphous | ⊚ |
| Experiment 29 | $Ta_3Sn_{25}O_{27}N_{45}$ | 2.05 | 2.6 | Amorphous | ⊚ |
| Experiment 30 | $Ta_3In_{13}Sn_{12}O_{27}N_{45}$ | 2.07 | 2.8 | Amorphous | ⊚ |
| Experiment 31 | $Ta_2O_5$ (Stoichiometric ratio) | 2.30 | 10.0 | Crystalline | x |
| Experiment 32 | ZnS (Stoichiometric ratio | 2.30 | 11.0 | Crystalline | x |
| Experiment 33 | AlN (Stoichiometric ratio) | 2.00 | 9.0 | Crystalline | x |

*Experiments 31-33 are comparative.

From Experiments 18-33, it can be seen that the addition of nitrogen reduces the internal stress of the nitrogen-containing Ta oxide to ⅓ to 1/5, and provides a high refractive index of 2.05 to 2.35 at a wide composition range regardless of the nitrogen content. This means that a high refractive index can be easily obtained even if the condition of deposition, that is, the $N_2$ partial pressure in the sputtering gas is varied in a wide range. It is noted that a high refractive index of 2.1 or more can be obtained by a Ta content of 10 at % or more. It was also surprisingly found that the nitrogen-containing Ta oxide is amorphous. Therefore, it is considered that an effect is obtained of reducing noise by decreasing scattering of a laser beam at the crystal grain boundaries during recording and reproducing, or by decreasing deformation of a bit shape due to a nonuniform thermal conduction during recording. The adhesivity of the deposited layer to the PC substrate is improved when the layer is formed of a nitrogen-containing Ta oxide in comparison with layers of $Ta_2O_5$, ZnS and AlN, but a nitrogen-containing oxide of Ta further added with In and/or Sn more preferably obtains an even higher adhesivity.

From the above, it is expected that by using the nitrogen-containing Ta oxide for a transparent dielectric layer of a magneto-optical recording medium, the confinement of a laser beam is improved and an increased recording sensitivity and CNR is obtained. Also, the reduction of the internal stress of the layer allows a prevention of defects such as peeling or cracks in a high temperature and high humidity environment test.

WORKING EXAMPLES 25-37

Magneto-optical recording mediums having a structure as shown in FIG. 2, and using a nitrogen-containing Ta oxide layer, were manufactured and evaluated.

A polycarbonate disc substrate 11 provided with 1.6 μm pitch grooves and having a diameter of 130 mm and a thickness of 1.2 mm was set in a vacuum chamber of an RF magnetron sputtering unit SPF-430H type (ANELVA Corporation) with three targets and the chamber was evacuated to $4 \times 10^{-7}$ Torr ($5.33 \times 10^{-5}$ Pa). During deposition, the substrate was rotated at 15 rpm.

Using the same procedures as in Experiments 18-30, transparent dielectric layers 12 of the nitrogen-containing Ta oxide having a composition shown in Table 7 were formed on the substrate 11. Namely, the target was a sintered disc of $Ta_2O_5$ having a diameter of 100 mm and a thickness of 5 mm on which a required number of $In_2O_3$ and/or $SnO_2$ chips are arranged, to obtain a composition of the deposited layer as shown in Table 7. Then, a $Ar/N_2$ gas mixture was introduced into the vacuum chamber and the pressure was adjusted to 5 mTorr (0.67 Pa) by a flow rate of the $Ar/N_2$ gas. The RF sputtering was carried out at a discharge power of 100 W and a discharge frequency of 13.56 MHz, to deposit layers having the compositions as shown in Table 7, at a thickness of about 70 nm.

Next, a transparent alloy layer 17 of an $Al_{90}Re_{10}$ alloy, about 1.5 nm, was deposited by RF magnetron sputtering under the same conditions as above, except that the target was changed to a disc of Al with Re chips ($5 \times 5 \times 1$ mm) thereon and the sputtering gas was changed to pure Ar (5N).

Then, a magneto-optical recording layer 13 of a $Tb_{23}Fe_{69}Co_8$ alloy, about 40 nm thick, was deposited by RF magnetron sputtering under the same conditions as for the AlRe layer 17, except that the target was a disc of $Tb_{23}Fe_{69}Co_8$.

Further, a rear side protecting layer 14 of an AlRe alloy, about 50 nm thick, was deposited by the same procedures as for the AlRe layer 17.

In the above procedures, magneto-optical recording mediums having a stack structure as shown in FIG. 2, and having a transparent dielectric layer of nitrogen-containing Ta oxide having a composition as shown in Table 7, were obtained.

The Kerr rotation angles of the mediums, measured with a layer beam having a wavelength of 633 nm, are shown in Table 7. The CNR of the mediums was also measured. The measurement was made by recording, reproducing and erasing the medium at a location 30 mm from the center of the disc, the disc being rotated at a speed of 1800 rpm, in a magneto-optical recording and reproducing unit Nakamichi OMS-1000 Type III. The reproduction of information was made at a laser power of 1.2 mW. The optimum laser power for recording was a value such that the difference between the first and second harmonic waves during the reproduction of information became largest at that power. The information frequency was 2.0 MHz. The optimum laser power for each medium is shown in Table 7. The applied magnetic field during the recording and erasing was 500 Oe (Oersted). The obtained CNR and noise level of the mediums are shown in Table 7.

Observation of the mediums showed that defects such as pin holes and cracks were not formed.

The mediums were then tested by being placed under a high temperature and high humidity atmosphere of 80° C. and 85% RH for 1000 hours. Thereafter that, the Kerr rotation angle, optimum laser power for recording, CNR, and noise level were measured, and it was found that they were not differ from those before the test. No defects such as pin holes and cracks were found.

COMPARATIVE EXAMPLES 7-9

Magneto-optical recording mediums having a structure as shown in FIG. 2 and having a conventional $Ta_2O_5$, ZnS or AlN as the transparent dielectric layer 12 were manufactured and evaluated.

A polycarbonate resin disc substrate 11 having a diameter of 130 mm and a thickness of 1.2 mm, and provided with 1.6 μm pitch grooves, was set in the same sputtering unit as in Working examples 25-37.

The $Ta_2O_5$, ZnS or AlN layer of the dielectric layer 12 having a thickness of 70 nm was formed by the same procedures as in Experiments 31-32 using a sintered target of $Ta_2O_5$, ZnS or AlN, in combination with $Ar/O_2$, pure Ar (5N) and $Ar/N_2$, respectively, and the other layers were formed by sputtering under the same conditions as in Working examples 25-37. Thus, a magneto-optical recording medium having the same structure as in Working examples 25-37, except that the dielectric layer 12 was $Ta_2O_5$, ZnS or AlN, was obtained.

In the same manner as in Working examples 25-37, the Kerr rotation angle, recording power, CNR, and noise level of the medium were evaluated. The results are shown in Table 7.

Observation of the surface of the medium, showed no defects such as pin holes, peeling and cracks.

The medium was then placed in a high temperature and high humidity atmosphere of 80° C. and 85% RH. Thereafter, the Kerr rotation angle, optimum recording laser power, CNR, and noise level of the medium were examined. The results are shown in Table 7. It is seen that all of the Kerr rotation angle, recording sensitivity, CNR, and noise level of the medium after the placing were lower, and that pin holes were observed on the surface of the medium.

$_8Fe_{60}Co_{12}$ was used, and the sputtering was carried out under the same conditions as above, whereby a magneto-optical recording layer 13 of $Nd_5Dy_{15}Tb_8Fe_{60}Co_{12}$ having a thickness of 20 nm was deposited.

TABLE 7

| Sample | Composition of layer (at %) | Kerr rotation angle $\theta k$ (°) | Recording power (mW) | CNR (dB) | Noise level (dBm) |
|---|---|---|---|---|---|
| Working example 25 | $Ta_{28}O_{71}N_1$ | 0.98 | 4.3 | 54.8 | −60.1 |
| Working example 26 | $Ta_{28}O_{62}N_{10}$ | 0.90 | 4.5 | 54.3 | −59.5 |
| Working example 27 | $Ta_{28}O_{42}N_{30}$ | 0.89 | 4.6 | 53.7 | −59.0 |
| Working example 28 | $Ta_{28}O_{27}N_{45}$ | 0.85 | 5.0 | 53.5 | −58.3 |
| Working example 29 | $Ta_{27}In_1O_{27}N_{45}$ | 0.86 | 4.6 | 53.5 | −58.5 |
| Working example 30 | $Ta_{18}In_{10}O_{27}N_{45}$ | 0.84 | 4.8 | 52.9 | −57.9 |
| Working example 31 | $Ta_{13}In_{15}O_{27}N_{45}$ | 0.81 | 5.0 | 52.8 | −57.7 |
| Working example 32 | $Ta_3In_{25}O_{27}N_{45}$ | 0.79 | 5.4 | 52.3 | −57.1 |
| Working example 33 | $Ta_{27}Sn_1O_{27}N_{45}$ | 0.85 | 4.7 | 53.3 | −58.6 |
| Working example 34 | $Ta_{18}Sn_{10}O_{27}N_{45}$ | 0.84 | 4.8 | 53.1 | −58.3 |
| Working example 35 | $Ta_{13}Sn_{15}O_{27}N_{45}$ | 0.80 | 4.9 | 52.6 | −57.7 |
| Working example 36 | $Ta_3Sn_{25}O_{27}N_{45}$ | 0.77 | 5.3 | 52.5 | −57.5 |
| Working example 37 | $Ta_3In_{13}Sn_{12}O_{27}N_{45}$ | 0.77 | 5.5 | 52.8 | −57.8 |
| Before placing | | | | | |
| Comparative example 7 | $Ta_2O_5$ (Stoichiometric ratio) | 0.89 | 4.5 | 53.0 | −57.5 |
| Comparative example 8 | ZnS (Stoichiometric ratio) | 0.90 | 4.4 | 52.8 | −57.0 |
| Comparative example 9 | AlN (Stoichiometric ratio) | 0.71 | 7.0 | 51.0 | −55.0 |
| After placing | | | | | |
| Comparative example 7 | $Ta_2O_5$ (Stoichiometric ratio) | 0.81 | 5.1 | 51.5 | −56.0 |
| Comparative example 8 | ZnS (Stoichiometric ratio) | 0.80 | 4.9 | 51.0 | −56.2 |
| Comparative example 9 | AlN (Stoichiometric ratio) | 0.64 | 7.6 | 49.5 | −53.9 |

WORKING EXAMPLE 38

A magneto-optical recording medium having a metal reflecting layer for utilizing the Faraday effect as shown in FIG. 3, in which layers 11, 12 and 13 are the same as shown in FIG. 2, layer 14 is a rear side protecting layer (in this case, front and rear side protecting layers 17 and 18 are omitted), and layer 15 is a metal reflecting layer.

A polycarbonate resin substrate 11 having a diameter of 130 mm and a thickness of 1.2 mm and provided with 1.6 μm pitch grooves was set in the same sputtering unit as in Working examples 25-37.

First, a nitrogen-containing Ta oxide layer was formed as the dielectric layer 12 on the substrate 11. An Ar/N₂ gas (N₂: 30 vol %) was introduced into a vacuum chamber and the flow rate of the Ar/N₂ gas was adjusted so that the pressure in the chamber was 5mTorr (0.67 Pa). The target was a sintered disc target having a composition of $Ta_{27}In_1O_{72}$, a diameter of 100 mm, and a thickness of 5 mm. An RF sputtering was carried out at a discharge power of 100 W and a layer 12 having a composition of $Ta_{27}In_1O_{27}$ and a discharge frequency of 13.56 MHz. Thus, a dielectric thickness of about 100 nm was deposited.

Then, the sputtering gas was changed from the Ar/N₂ pure Ar (5N), an alloy target of $Nd_5Dy_{15}Tb$-

Again, the target was changed to the sintered $Ta_{27}In_1O_{72}$ target used for the dielectric layer 12 and sputtering was carried out under the same conditions as for the dielectric layer 12, whereby a rear side dielectric protecting layer 14 of TaInON having a thickness of about 50 nm was deposited.

Finally, the target was changed to the target of Al with Re chips (5 mmφ × 1 mm disc) and sputtering was carried out under the same conditions for the recording layer 13, whereby a metal reflecting layer 15 of $Al_{90}Re_{10}$ having a thickness of about 50 nm was deposited.

In the same manner as in Working examples 25-37, the Kerr rotation angle, recording power, CNR and noise level of the obtained magneto-optical recording medium were evaluated. The results were a Kerr rotation angle of 1.05°, a recording power of 4.5 mW, a CNR of 54.7 dB and a noise level of −60.0 dBm. Observation of the disc surface showed that no defects such as pin holes or peeling or cracks were found.

The disc was then placed under a high temperature and high humidity atmosphere of 80° C. and 85% of RH for 1000 hours. Thereafter, the Kerr rotation angle, optimum recording laser power, CNR and noise level were evaluated. It was found that there was no difference to those before the placing. Defects such as pin holes or peeling or cracks of the medium were not found.

WORKING EXAMPLE 39

A magneto-optical recording medium having an exchange-coupled magneto-optical recording layer, which has a structure similar to FIG. 2 except that the recording layer 13 was divided into two layers 13a and 13b (not shown) and a metal layer 17 is omitted, was formed.

A polycarbonate resin substrate having a diameter of 130 mm and a thickness of 1.2 mm and provided with 1.6 μm pitch grooves was set in the same sputtering unit as in Working examples 25-37.

First, a nitrogen-containing Ta oxide layer was formed as the dielectric layer 12 on the substrate 11. An Ar/N$_2$ gas (N$_2$: 30 vol %) was introduced into a vacuum chamber and the flow rate of the Ar/N$_2$ gas was adjusted so that the pressure in the chamber was 5 mTorr (0.67 Pa). The target was a sintered disc target having a composition of Ta$_{27}$In$_1$O$_{72}$, a diameter of 100 mm, and a thickness of 5 mm. An RF sputtering was carried out at a discharge power of 100 W with a discharge frequency of 13.56 MHz. Thus, a dielectric layer 12 having a composition of Ta$_{27}$In$_1$O$_{27}$N$_{45}$ and a thickness of about 70 nm was deposited.

Then, the sputtering gas was changed from the Ar/N$_2$ to pure Ar (5N), an alloy target of Gd$_{24}$Fe$_{56}$Co$_{20}$ or Tb$_{23}$Fe$_{69}$Co$_8$, or a Cu target with Ti chips (5×5×1 mm) thereon was used, and the sputtering was carried out under the same conditions as above, whereby a first recording layer 13a of Gd$_{24}$Fe$_{56}$Co$_{20}$ having a thickness of 15 nm, a second recording layer 13b of Tb$_{23}$Fe$_{69}$Co$_8$ having a thickness of 25 nm, and a rear side metal protecting and reflecting layer 14 of Cu$_{95}$Ti$_5$ having a thickness of 50 nm were deposited, in this order. However, the first and second magneto-optical recording layers are in the state of exchange coupling.

In the same manner as in Working examples 25-37, the Kerr rotation angle, recording power, CNR and noise level of the obtained magneto-optical recording medium were evaluated. The results showed a Kerr rotation angle of 1.20°, a recording power of 4.7 mW, a CNR of 57.0 dB, and a noise level of −60.2 dBm. Observation of the disc surface showed that no defects such as pin holes or peeling or cracks were formed.

From Experiments 18-33 and Working examples 25-39 and comparative examples 7-9, it was confirmed that increases of the Kerr rotation angle, recording sensitivity, and CNR and a lowering of the noise level, of a magneto-optical recording medium can be obtained by using a nitrogen-containing Ta oxide layer optionally further containing In and/or Sn as a dielectric layer, which was expected from the characteristics of the layers as seen in Experiments 18-33.

Namely, an increase of the refractive index of the dielectric layer by the nitrogen-containing Ta oxide layer causes an increase of a light interference effect, specifically the effect of a confinement of a laser beam, whereby the Kerr rotation angle, recording sensitivity and CNR can be improved.

Also, as seen in Experiments 18-33, the complex oxide layers of the transparent dielectric layer in Working examples 25-39 were amorphous, which prevents a scattering of a laser beam at the crystal grain boundaries and deformation of a bit shape by a nonuniform thermal conduction at the crystal grain boundaries, in comparison with the dielectric layer of Ta$_2$O$_5$, ZnS or AlN, etc. alone, which is crystalline, whereby a lowering of the noise level of the medium is obtained.

As seen in Experiments 22-30, the adhesivity of the dielectric layer of a nitrogen-containing Ta oxide to a PC substrate is further improved by adding In and/or Sn to the dielectric layer. Moreover, the nitrogen-containing Ta oxide layers of Working examples 25-39 have a reduced internal stress of ½ to ¼ of that of those of the Ta$_2$O$_5$, ZnS and AlN layers, as seen in Experiments 18-33. Accordingly, peeling or cracks of the nitrogen-containing Ta oxide layer of a medium caused to by a large internal stress of the layer or a poor adhesivity of the layer to a PC substrate does not occur, even in an accelerated aging test under a high temperature and high humidity environment. Thus, the nitrogen-containing Ta oxide layer or a medium having the same layer has an improved durability or reliability.

WORKING EXAMPLES 40

Figure 4:
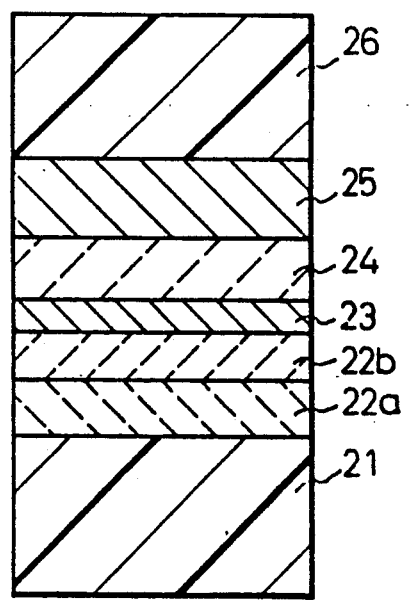

A magneto-optical recording medium having a structure as shown in FIG. 4, in which 21 denotes a substrate, 22a a first front side transparent dielectric layer, 22b a second front side transparent dielectric layer, 23 a recording layer, 24 a rear side transparent dielectric layer, 25 a metal reflecting layer, and 26 an organic protecting layer.

A polycarbonate resin disc substrate 21 having a diameter of 130 mm and a thickness of 1.2 mm and provided with 1.6 μm pitch grooves was set in a vacuum chamber of an RF magnetron sputtering unit SPF 430H type (ANELVA Corporation) having three targets, and the chamber was evacuated to 4×10$^{-7}$ Torr (5.33×10$^{-5}$ Pa). The substrate 21 was rotated at 15 rpm during the deposition.

First, the first front side transparent dielectric layer 22a was formed in the following manner. A mixed gas of Ar/N$_2$ (N$_2$: 30 vol %) was introduced into the chamber and the flow rate of the Ar/N$_2$ gas was adjusted so that the pressure in the chamber was 10 mTorr (1.33 Pa). The target was a sintered oxide disc having a diameter of 100 mm and a thickness of 5 mm and a composition of In$_x$Sn$_y$O$_{100-(x+y+z)}$, wherein the composition (x, y, z) is (40, 0, 0), (36, 4, 0), (20, 20, 0), (0, 40, 0), (36, 0, 4), (20, 0, 20) or (20, 10, 10). An RF sputtering was carried out at a discharge power of 100 W and a discharge frequency of 13.56 MHz, to form a nitrogen-containing oxide layer of (In, Sn, Bi) ON of In$_{40}$O$_{50}$N$_{10}$, In$_{36}$Sn$_4$O$_{50}$N$_{10}$, In$_{20}$Sn$_{20}$O$_{50}$N$_{10}$, Sn$_{40}$O$_{50}$N$_{10}$, In$_{36}$Bi$_4$O$_{50}$N$_{10}$, In$_{20}$Bi$_{20}$O$_{50}$N$_{10}$, or In$_{20}$Sn$_{10}$Bi$_{10}$O$_{50}$N$_{10}$, respectively, having a thickness of about 20 nm, as the first front side transparent dielectric layer 22a.

Then, the target was changed to a sintered disc of Al$_{50}$Si$_{50}$ and the sputtering was carried out under the same conditions as above, to deposit an Al$_{25}$Si$_{25}$N$_{50}$ layer having a thickness of about 100 nm as the second front side transparent dielectric layer 22b. Successively, the target was changed to a disc of Tb$_{23}$Fe$_{69}$Co$_8$ and the sputtering gas was changed from Ar/N$_2$ to pure Ar (5N), and sputtering was carried out under the same conditions as above, to deposit a TbFeCo alloy layer having a thickness of about 25 nm as the magneto-optical recording layer 23.

The target was again changed to a sintered disc of Al$_{50}$Si$_{50}$ and the sputtering gas was changed from pure Ar to a mixed gas of Ar/N$_2$, and sputtering was carried out to deposit an Al$_{25}$Si$_{25}$N$_{50}$ layer having a thickness of about 20 nm as the rear side transparent dielectric layer 24.

Then, the target was changed to a sintered disc of $Al_{99.6}Ti_{0.4}$ and the sputtering gas was changed from a mixed $Ar/N_2$ gas to pure Ar (5 N), and sputtering was carried out to deposit an $Al_{99.6}Ti_{0.4}$ alloy layer having a thickness of about 50 nm as the metal reflecting layer 25.

Finally, the obtained stack was removed from the sputtering unit and mounted on a spin coater. An UV curable phenol novolac epoxy acrylate resin was coated on the disc while rotating the disc, followed by passing the coated disc through an UV irradiating unit to cure the resin, to thus form an organic protecting layer 26, about 50 μm thick.

Accordingly, a magneto-optical recording medium having a structure of PC/(In, Sn, Bi)ON/AlSiN/TbFeCo/AlSiN/AlTi/Organic layer as shown in FIG. 4 was obtained.

A CNR of this disc was then determined. The measurement was made by using a magneto-optical recording and reproducing unit "Venus" (Seiko Epson) and recording, reproducing and erasing at a location 30 mm from the center of the disc, the disc being rotated at 1800 rpm.

The reproducing power was 1.2 mW. The optimum recording laser power was determined by a maximum value of the difference between the first and second harmonic waves during a reproduction of information. The frequency of the information was 3.7 MHz and the duty was 33%. All mediums exhibited an optimum recording power of 5.0 mW, a maximum CNR of 49.0 dB, and a noise level of −51.0 dBm.

Observation of these mediums showed that no defects such as pin holes, peeling or cracks were formed.

The mediums were then placed under a high temperature and a high humidity of 80° C. and 85% RH for 2000 hours. Thereafter, the optimum laser power and CNR noise were determined but no differences were observed from those before the placing. Observation of the mediums showed that no defects such as pin holes, peeling or cracks were formed.

WORKING EXAMPLE 41

Another magneto-optical recording medium having a structure as shown in FIG. 4 was manufactured.

A carbonate resin disc substrate 21 having a diameter of 130 mm and a thickness of 1.2 mm and provided with 1.6 μm pitch grooves was set in a vacuum chamber of an RF magnetron sputtering unit SPF-430H type (ANELVA Corporation) having three targets, and the chamber was evacuated to $4 \times 10^{-7}$ Torr ($5.33 \times 10^{-5}$ Pa). The substrate 21 was rotated at 15 rpm during the deposition.

First, a first front side transparent dielectric layer 22a was formed in the following manner. A mixed gas of $Ar/O_2$ ($O_2$: 1 vol %) was introduced into the chamber and the flow rate of the $Ar/O_2$ gas was adjusted so that the pressure in the chamber was 10 mTorr (1.33 Pa). The target was a sintered oxide disc having a diameter of 100 mm and a thickness of 5 mm and a composition of $In_xSn_yBi_yO_{100-(x+y+z)}$ wherein the composition (x, y, z) is (36, 0, 4), (20, 0, 20), (0, 36, 4), (0, 20, 20) or (20, 10, 10). An RF sputtering was carried out at a discharge power of 100 W with a discharge frequency of 13.56 MHz, to form a nitrogen-containing oxide layer of (In, Sn) BiO of $In_{36}Bi_4O_{60}$, $In_{20}Bi_{20}O_{60}$, $Sn_{36}Bi_4O_{60}$, $Sn_{20}Bi_{20}O_{60}$ or $In_{20}Sn_{10}Bi_{10}O_{60}$, respectively having thickness of about 20 nm, as the first front side transparent dielectric layer 22a.

Then, the target was changed to a sintered disc of $Al_{50}Si_{50}$ and the sputtering gas was changed form $Ar/O_2$ to $Ar/N_2$ ($N_2$: 30 Vol %) and the sputtering was carried out under the same conditions as above, to deposit an $Al_{25}Si_{25}N_{50}$ layer having a thickness of about 100 nm as the second front side transparent dielectric layer 22b. Successively, the target was changed to a disc of $Tb_{23}Fe_{69}Co_8$ and the sputtering gas was changed from $Ar/N_2$ to pure Ar (5 N), and sputtering was carried out under the same conditions as above, to deposit a TbFeCo alloy layer having a thickness of about 25 nm as the magneto-optical recording layer 23.

The target was again changed to a sintered disc of $Al_{50}Si_{50}$ and the sputtering gas was changed from pure Ar to a mixed gas of $Ar/N_2$, and sputtering was carried out to deposit an $Al_{25}Si_{25}N_{50}$ layer having a thickness of about 20 nm as the rear side transparent dielectric layer 24.

Then, the target was changed to a sintered disc of $Al_{99.6}Ti_{0.4}$ and the sputtering gas was changed from a mixed $Ar/N_2$ gas to pure Ar (5N), and sputtering was carried out to deposit an $Al_{99.6}Ti_{0.4}$ alloy layer having a thickness of about 50 nm as the metal reflecting layer 25.

Finally, the obtained stack was removed from the sputtering unit and mounted on a spin coater. An UV curable phenol novolac epoxy acrylate resin was coated on the disc while rotating the disc, followed by passing the coated disc through an UV irradiating unit to cure the resin, to thus form an organic protecting layer 6, about 50 μm thick.

Accordingly, a magneto-optical recording medium having a structure of PC/(In, Sn) BiO/AlSiN/TbFeCo/ AlSiN/AlTi/Organic layer as shown in FIG. 4 was obtained.

The CNR, etc. of this disc were then determined. The measurement was made in the same manner as in Working example 40.

All mediums exhibited an optimum recording power of 5.0 mW, a maximum CNR of 49.0 dB, and a noise level of −51.0 dBm.

Observation of these mediums should that no defects such as pin holes peeling or cracks were formed.

The mediums were then placed under a high temperature and a high humidity of 80° C. and 85% RH for 2000 hours. Thereafter that, the optimum recording power and CNR noise were determined but no differences were observed for those before the placing. Observation of the mediums showed that no defects such as pin holes, peeling or cracks were formed.

COMPARATIVE EXAMPLE 10

Magneto-optical recording mediums having a structure similar to that of Working example 40, except that the first and second front side transparent dielectric layers 22a and 22b were replaced by a single transparent dielectric layer 22 (not shown), were manufactured and evaluated.

A polycarbonate resin disc substrate 21 having a diameter of 130 mm and a thickness of 1.2 mm and provided with 1.6 μm pitch grooves, was set in the same vacuum chamber and in the same manner as in Working example 40.

The front transparent dielectric layer 22 was formed by sputtering under the same conditions as in Working example 40, except that a sintered target of $Al_{50}Si_{50}$ or $In_{36}Sn_4O_{60}$ was used and the sputtering gas was a mixed gas of $Ar/N_2$ ($N_2$: 30 vol %), to deposit a layer of $Al_{2.5}Si_{25}N_{50}$ or $In_{36}Sn_4O_{50}N_{50}$ having a thickness of about 120 nm.

Then, in the same procedures as in Working example 40, by changing the sputtering gas, a recording layer 23 of TbFeCo having a thickness of about 25 nm, a rear side transparent dielectric layer 24 of AlSiN having a thickness of about 20 nm and a metal reflecting layer 25 of AlTi having a thickness of about 50 nm were deposited in this order. Finally, an organic protecting layer 26 of UV curable phenol novolac epoxy acrylate resin having a thickness of about 50 μm was coated thereon.

Thus, magneto-optical recording mediums having a structure of PC/(AlSiN, InSnON)/TbFeCo/AlSiN/AlTi/ Organic layer, the same as that of Working example 40 except that the transparent dielectric layer 22 was a single layer, were obtained.

The characteristics of these medium were determined under the same conditions as those of Working example 40, and it was found that the optimum laser power was 5.0 mW, the maximum CNR was 48.0 dB, and the noise level was −52.0 dBm.

The mediums were then placed under a high temperature and a high humidity environment of 80° C. and 85% RH. Thereafter, numerous cracks appeared and partial peeling occurred for the medium of PC/AlSiN/TbFeCo/ AlSiN/AlTi/Organic. The optimum laser power was not changed, but the CNR was lowered by 2 dB to 46.0 dB, and the noise level was raised by 2 dBm to −50 dBm. For the medium of PC/InSnON/TbFeCo/AlSiN/AlTi/Organic, cracks and peeling did not occur and the optimum laser power was not changed, but the CNR was lowered by 3 dB to 45.0 dB and the noise level was raised by 2 dB to −50 dBm.

This clearly demonstrate the superiority of the bilayer structure of the transparent dielectric layer.

WORKING EXAMPLE 42 AND COMPARATIVE EXAMPLE 11

Magneto-optical recording mediums such as shown in FIG. 2 having a structure of a substrate 1, a transparent dielectric layer 12 (a metal layer 17 is omitted), a recording layers 13 and a metal reflecting layer 14 were manufactured.

A polycarbonate resin disc substrate 11 having a diameter of 130 mm and a thickness of 1.2 mm and provided with 1.6 μm pitch grooves was set in a vacuum chamber of an RF magnetron sputtering unit SPF 430H type (ANELVA Corporation) having three targets and the chamber was evacuated to $4 \times 10^{-7}$ Torr ($5.33 \times 10^{-5}$ Pa). The substrate 11 was rotated at 15 rpm during the deposition.

A mixed gas of $Ar/N_2$ ($N_2$: 30 vol/ %) or $Ar/O_2$ ($O_2$: 10 vol %) was introduced into the chamber and the flow rate of the $Ar/N_2$ or $Ar/O_2$ gas was adjusted so that the pressure in the chamber was 10 mTorr (1.33 Pa). The target was a sintered oxide disc having a diameter of 100 mm and a thickness of 5 mm and a composition of $In_{36}Sn_4O_{64}$. An RF sputtering was carried out at a discharge power of 100 W and a discharge frequency of 13.56 MHz, to deposit a nitrogen-containing oxide layer of $In_{36}Sn_4O_5N_{10}$ (Working example 42) or an oxide layer of $In_{36}Sn_4O_{64}$ (Comparative example 11), respectively, having a thickness of about 80 nm, as the front side transparent dielectric layer 12.

Then, the target was changed to a sintered disc of $Tb_{23}Fe_{69}Co_8$ and the sputtering gas was changed from $Ar/N_2$, and the sputtering was carried out under the same conditions as above, to deposit a TbFeCo alloy layer having a thickness of about 25 nm as the recording layer 13. Then, the target was changed to a disc of $Al_{99.4}Ti_6$, and sputtering was carried out under the same conditions as above, to deposit an AlTi alloy layer having a thickness of about 50 nm as the metal reflecting layer 14.

Accordingly, mediums having the following structures were obtained.

Working example 42: PC/InSnON/TbFeCo/AlTi

Comparative example 11: PC/InSnO/TbFeCo/AlTi

When these mediums were observed, no pin holes, peeling or cracks were detected for the medium of Working example 42, but numerous pin holes were detected over the surface of the medium and cracks were partially seen in the medium of Comparative example 11.

It is considered that the pin holes were caused by an extraordinary discharge, which often occurred during the sputtering in an oxygen-containing and nitrogen-less atmosphere, but not in a nitrogen-containing atmosphere.

Thus, the superiority of a process of RF magnetron sputtering in a nitrogen atmosphere to in an oxygen-containing atmosphere is clearly seen.

We claim:

1. An optical recording medium, comprising a substrate, a transparent dielectric layer as a protecting and/or enhancing layer, and an optical recording layer, wherein said transparent dielectric layer is amorphous, and consists of an oxide of at least one metal selected from the group consisting of indium, tin and tantalum, said oxide further consisting of at least one element selected from the group consisting of nitrogen and bismuth.

2. A medium according to claim 1 wherein said transparent dielectric layer is made of an oxide of indium and/or tin containing nitrogen.

3. A medium according to claim 2 wherein the content of nitrogen in said transparent dielectric layer is not more than 40 at %.

4. A medium according to claim 1, wherein said transparent dielectric layer is made of a complex oxide of, indium and/or tin, and bismuth.

5. A medium according to claim 4, wherein the content of bismuth in said transparent dielectric layer is not more than 50 at %.

6. A medium according to claim 4, wherein said transparent layer of the complex oxide of indium and/or tin and bismuth further contains nitrogen.

7. A medium according to claim 6, wherein the content of nitrogen in said transparent dielectric layer is not more than 40 at %.

8. A medium according to claim 1, wherein said transparent dielectric layer is made of tantalum oxide containing nitrogen.

9. A medium according to claim 8, wherein the content of nitrogen in said transparent dielectric layer is not more than 45 at %.

10. A medium according to claim 9, wherein said transparent dielectric layer further contains indium and/or tin.

11. A medium according to claim 10, wherein the content of indium and/or tin in said transparent dielectric layer is not more than 25 at %.

12. A medium according to claim 1, further comprising a second transparent layer of a metal or dielectric not containing oxygen, between said dielectric transparent layer and said recording layer.

13. A medium according to claim 1, wherein said recording layer is a magneto-optical recording layer.

14. A medium according to claim 1, wherein said magneto-optical recording layer comprises at least one rare earth element and at least one transition metal.

15. A medium according to claim 1, wherein said substrate is made of a transparent synthetic resin.

16. A process for manufacturing an optical recording medium, comprising a substrate, a transparent dielectric layer as a protecting and/or enhancing layer, and an optical recording layer, wherein said transparent dielectric layer is amorphous, and is made of an oxide of at least one metal selected from the group consisting of indium, tin and tantalum, said oxide further containing at least one element selected from the group of nitrogen and bismuth, characterized in that a target of an oxide of at least one of indium, tin, tantalum and bismuth is sputtered in a nitrogen-containing atmosphere to deposit the nitrogen-containing oxide layer on the substrate.

* * * * *